United States Patent
Read (10) Patent No.: US 6,563,863 B1
(45) Date of Patent: May 13, 2003

(54) COMPUTER MODEM

(75) Inventor: Brooks S. Read, Concord, MA (US)

(73) Assignee: ATI International Srl, Hastings (BB)

( * ) Notice: Subject to any disclaimer, the term of this patent is extended or adjusted under 35 U.S.C. 154(b) by 0 days.

(21) Appl. No.: 09/102,028

(22) Filed: Jun. 22, 1998

(51) Int. Cl.[7] .............................. H04B 1/38; H04L 5/16

(52) U.S. Cl. .......................... 375/222; 370/286; 379/3; 379/410

(58) Field of Search .............................. 375/213, 219, 375/220, 222, 224, 228, 230, 257, 377, 229, 357; 379/1, 3, 406, 410; 370/286, 289, 290

(56) References Cited

U.S. PATENT DOCUMENTS

| | | | |
|---|---|---|---|
| 4,385,384 A | * 5/1983 | Rosbury et al. | |
| 5,001,480 A | * 3/1991 | Ferry et al. | ............. 341/108 |
| 5,377,257 A | * 12/1994 | Shirasaka et al. | |
| 5,414,767 A | * 5/1995 | Kerguiduff | ............. 379/410 |
| 5,535,014 A | * 7/1996 | Sommer | |
| 5,721,830 A | 2/1998 | Yeh et al. | |
| 5,844,970 A | * 12/1998 | Hsu | ............. 379/93.24 |
| 6,233,250 B1 | 5/2001 | Liu et al. | ............. 370/469 |
| 6,400,724 B1 | 6/2002 | Yao | ............. 370/429 |

FOREIGN PATENT DOCUMENTS

| | | | |
|---|---|---|---|
| EP | 0 896 443 A2 | 10/1998 | ......... G06F/17/30 |

OTHER PUBLICATIONS

Electronics Industry Association/Telecommunications Industry Association "asynchronous facsimile DCE control standard" Nov. 1990.*

North et al, the performance of adaptive equalization for digit, communication systems corrupted by interference, 1993 Confernce Record of The Twenty–seventh asilomar Confrence on 1993, pp. 1548–1553 vol. 2.*

Search Report in corresponding PCT application serial No. PCT/US99/14080.

* cited by examiner

*Primary Examiner*—David E. Boundy
*Assistant Examiner*—Jean Corrielus
(74) *Attorney, Agent, or Firm*—Schulte Roth & Zabel LLP (57) ABSTRACT

A service chip for use with a computer. The chip includes a CPU interface, a transceiver interface, an adaptive echo cancellation filter, a monitor, and first and second data synthesizers. The CPU interface receives a transmit sample sequence from a modem sample generator executing on a central processor of the computer, and presents a receive sample sequence to a modem sample receiver executing on the central processor. The transceiver interface presents data to a line interface, which includes digital-to-analog and analog-to-digital converters for converting samples to/from analog signals for transmission on a telephone line. The filter adapts in response to an echo correlation between data transmitted over a transmit channel of the modem and data received on a receive channel of the transceiver interface. The monitor monitors the transmit sample sequence for a data starvation condition. The first synthesizer synthesizes a transmit sample sequence for delivery to the digital-to-analog converter over the transceiver interface when the monitor detects the data starvation condition, the synthesized transmit sample sequence being essentially free of timing information. The second synthesizer synthesizes a received data sequence for delivery on a modem receive channel to the central processing unit through the CPU interface when the monitor detects the data starvation condition, the synthesized received data sequence imperfectly approximating an echo of the transmit data channel, synthesis of the received data sequence being based on the adapted parameters of the echo cancellation filter.

79 Claims, 5 Drawing Sheets

COMPUTER MODEM

BACKGROUND

The invention relates to modems.

A modem ("modulator-demodulator") is the electronic device that sends digital information, typically from a computer, over an analog communication channel, for instance, a telephone line. In a typical transmit application, a modem accepts digital data from a computer, and generates analog waveforms that can be carried by a telephone line. In a receive role, the modem accepts analog waveforms from the line and produces digital data for use by the computer. The protocol for translating digital data to and from analog waveforms is agreed among modem manufacturers.

Modem transmit protocols require continuous control of the analog output: if the transmit circuitry does not keep up with the continuous process of translating digital data to analog waveforms, the resultant departure from the protocol can result in a retraining of the modems, resulting in transmission delays or the line being hung up.

As the speed of computer central processing units (CPU's) has increased, the signal processing functions of modems have been moved from dedicated hardware to the CPU. If that CPU is delayed in servicing a request from the transmit circuitry of the modem, the consequences of the previous paragraph result.

SUMMARY

In general, in a first aspect, the invention features a technique for use in a computer modem. A modem transmit data channel is monitored for a data starvation condition. When the data starvation condition is detected, a data sequence is synthesized on a receive channel of the modem, the synthesized data sequence being essentially independent of data received on a receive terminal of the modem.

In general, in a second aspect, the invention features a technique for use in a computer modem. Parameters of an echo cancellation filter are adapted, responsive to data transmitted over a modem transmit channel and received on a modem receive channel. When the transmit channel is disrupted, a data sequence is synthesized in the receive channel, the data of the synthesized sequence being based on the adapted parameters of the echo cancellation filter.

Preferred embodiments of the invention may include one or more of the following features. The synthesized receive data sequence may be synthesized to approximate an echo of data transmitted on the transmit data channel. The synthesized approximate echo may reflect an intentional misadjustment. The misadjustment may be induced by ignoring components of the data sequence received from a far modem, for instance the message data from the far modem, or a far modem echo. The intentional misadjustment may be induced by configuring a filter with a number of taps insufficient to model an impulse response of a round-trip over a transmission channel from the transmit data channel to the receive channel. The intentional misadjustment may be induced by selecting a filter adaptation parameter to preserve a misadaptation of the filter, for instance, the filter's adaptation mu parameter. The data starvation condition may be detected when a CODEC demands data from an empty transmit data buffer.

In general, in a third aspect, the invention features a technique for use in a computer modem. When a data starvation condition is detected on a modem transmit data channel, a waveform sample sequence is synthesized for transmission on a transmission channel of the modem, the synthesized waveform sample sequence being essentially free of timing information.

Preferred embodiments of the invention may include one or more of the following features. The synthesized data sequence may be synthesized by averaging the values of several samples from a generated transmit sample sequence. The number of samples averaged may correspond to an oversampling factor of the modem transmit data channel. The samples averaged may be drawn to provide roughly equal representation of all phases of the transmit signal.

Particular embodiments of the invention may feature one or more of the following advantages. The numerically-intensive signal processing and logically-intensive protocol management of a modem process can both be performed in the microprocessor of a computer system, reducing system cost. Delays in real time response of the microprocessor are less disruptive of modem communications. Retraining of the receive channel of a local or remote modem can be reduced. Hang ups of the modem can be reduced. A synthesized transmission can force a receive error, which will in turn force a retransmit under controlled conditions. A synthesized signal that allows the remote receiver's timing recovery process to coast is less likely to cause the remote receiver to diverge its timing synchronization from the transmitter during periods of signal substitution.

The above advantages and features are of representative embodiments only, and are presented to assist in understanding the invention. It should be understood that they are not to be considered limitations on the invention as defined by the claims, or equivalents to the claims. No single advantage should be considered necessary for equivalence. Additional features and advantages of the invention will become apparent in the following description, from the drawings, and from the claims.

DESCRIPTION

Overview

Figure 1:
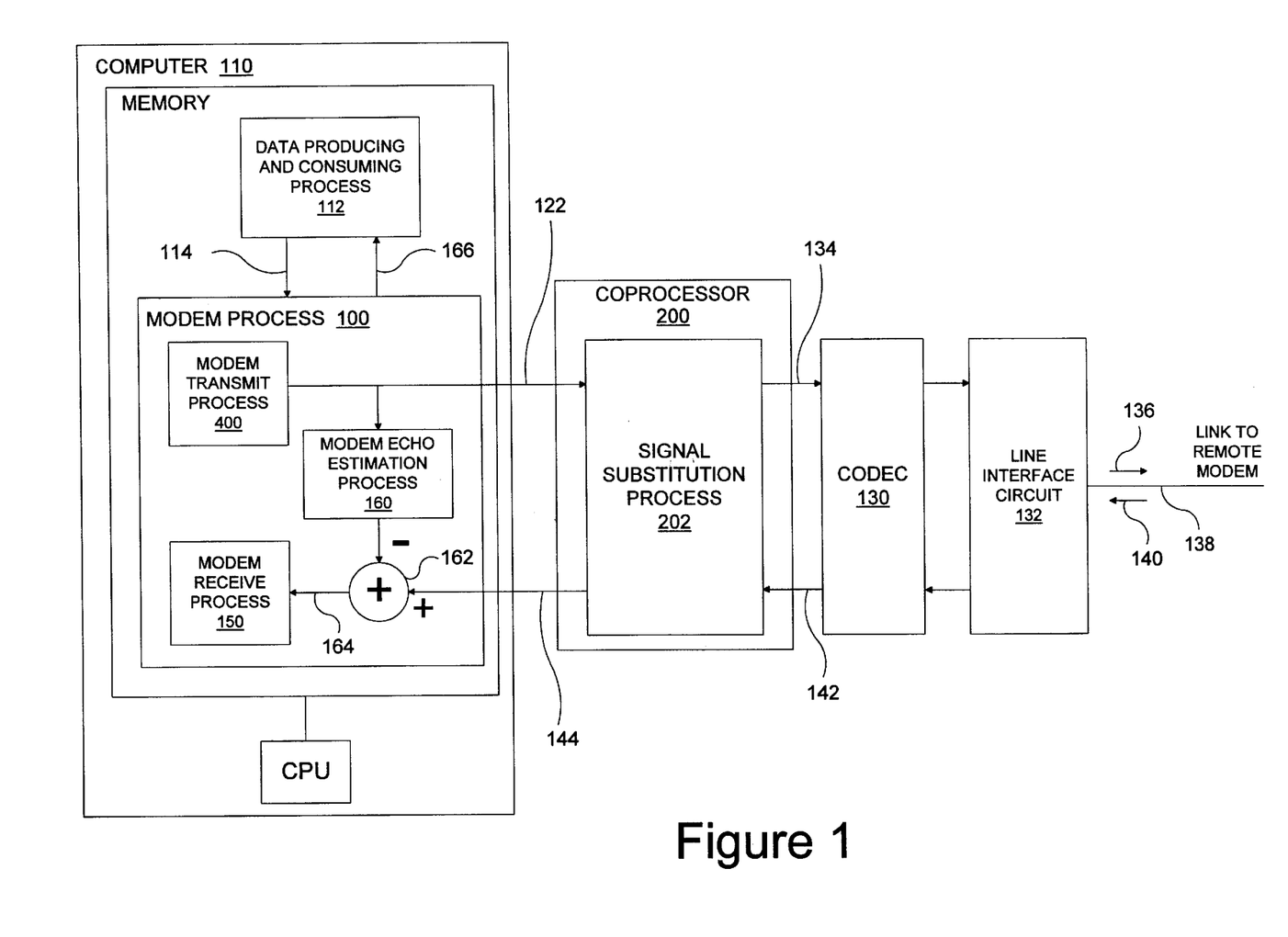
FIG. 1 is a block diagram of a modem implementation in a host computer.

Referring to FIG. 1, a modem may be implemented as a process 100 that runs on a host computer 110, with a hardware coprocessor 200. Data-generating process 112, running on computer 110, generates data 114 to be transmitted by a modem. These transmit data 114 are received by modem transmit process 400, which does signal processing to convert transmit data 114 into digital samples 122, for instance, according to the V.22 protocol. Samples 122 are buffered in coprocessor 200. CODEC (coder/decoder) 130 demands samples 134 from coprocessor 200, and converts samples 134 to analog form 136 for transmission to a remote modem (not shown), for instance via public telephone lines 138.

Similarly, receive signal 140 is received on line 138 from the remote modem, and converted by line interface circuit 132 and CODEC 130 into digital samples 142. After being buffered in a buffer (212 of FIG. 2) in coprocessor 200, received samples 144 are received by modem receive process 150. Echoes of transmit samples 122 that were induced in receive samples 144 (typically because of impedance mismatch at the near end and far end line interfaces) are removed by echo canceller 160, 162. A typical echo cancellation method observes the effect on echo path 122, 134, 130, 132, 138, 132, 130, 142, 144 of transmitting a datum during a time that receive channel 138, 132, 130, 142, 144 is quiescent. By observing the echo received, echo estimation process 160 can estimate the echo transfer function (a measure of the time delay and magnitude of echo), and use that estimate to remove echoes from samples received on channel 138, 132, 130, 142, 144. After subtracting 162 the estimated echo, echo-free received samples 164 are conveyed to modem receive process 150, which does signal processing to extract the received data 166, which in turn is given to the process 112 for which it was intended.

As long as modem transmit process 400 stays far enough ahead of CODEC 130 to maintain a real time sequence of samples 134 for transmission, CODEC 130 and line interface circuit 132 generate analog signals in real time, in conformance with the modem protocol.

However, if modem transmit process 400 is delayed in handling a demand from coprocessor 200 for more samples 122, in a conventional implementation, CODEC 130 starves for transmit samples 134. When starved, CODEC 130 transmits data of its own improvisation ad lib. Because the signal transmitted was not monitored by components upstream of CODEC 130, the echo of this improvised signal is not estimated by echo estimator 160. Therefore the resulting echo from this alternate transmit signal is not effectively cancelled by modem echo canceller 160, 162.

Where the echo is strong compared with the far modem signal, the estimated echo generated by echo estimation process 160 is approximately of the same average level as the far modem signal plus the echo. Therefore the subtraction 162 of the estimated echo from received signal 144 is a difference of relatively large numbers yielding the far modem signal, which is a smaller signal. When CODEC 130 is sample starved, and (in a conventional implementation) transmitted signal 136 is not correlated to the signal input to the echo canceller 160, 162, then the difference 164 of large signals will yield a large signal. This large signal input to modem receive process 150 may disrupt modem receive process 150. This disruption may force modem receive process 150 to retrain, which in turn will interrupt the transmit and receive functions for a number of seconds.

Figure 2:
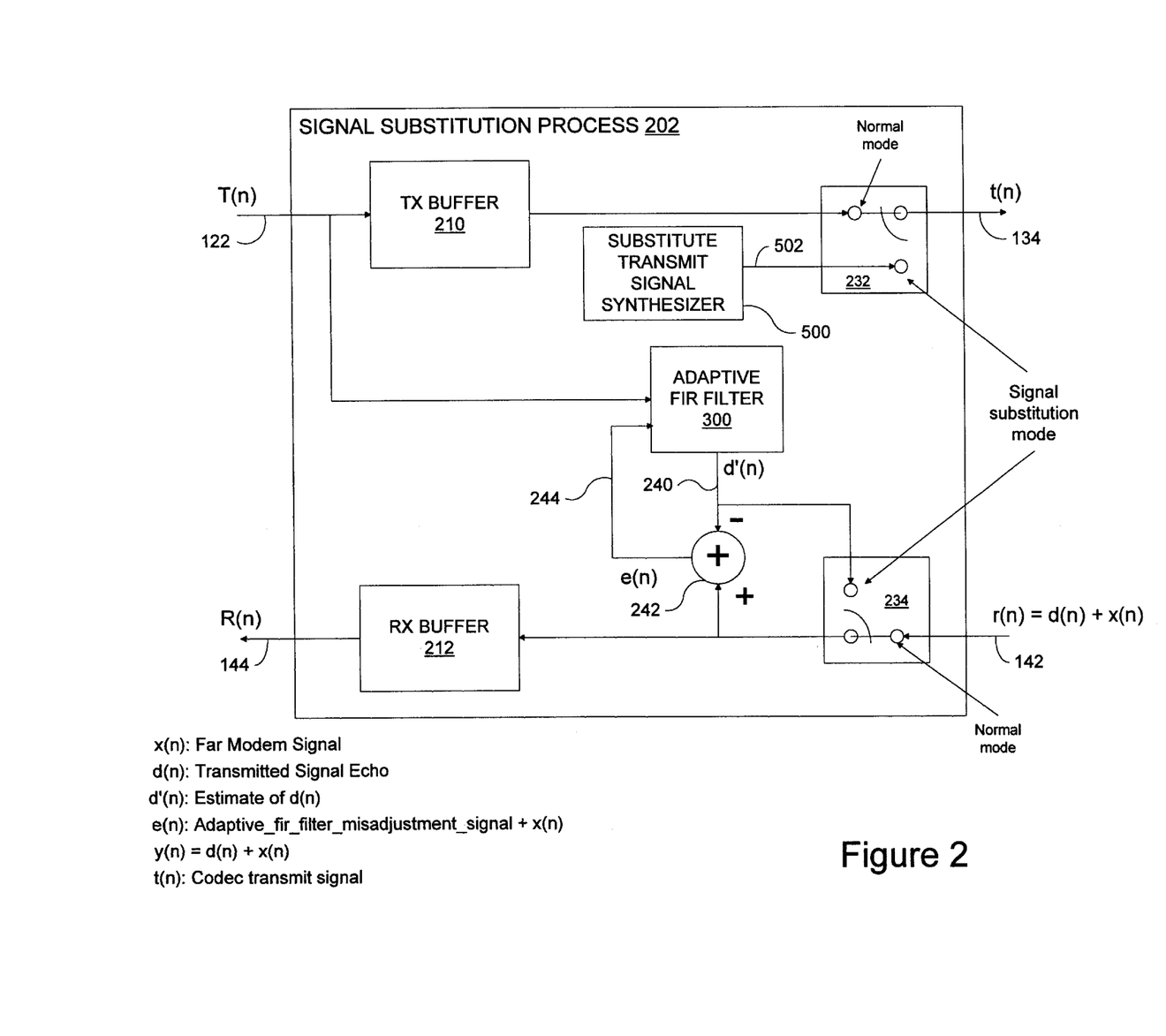
FIG. 2 is a block diagram of a signal substitution process for performance in the coprocessor of FIG. 1.

Referring to FIG. 2, signal substitution process 202 executes on coprocessor 200. During normal operation, transmit samples T(n) 122 pass unchanged to output t(n) 134, and received samples r(n) 142 (the sum of received signal x(n) transmitted by the far end modem, plus echo d(n)) pass unchanged to receive output R(n) 144. The two channels are analyzed by adaptive FIR filter 300, which roughly mirrors the echo cancellation analysis of echo canceller 160—adaptive FIR filter 300 analyzes samples T(n) 122 being transmitted and samples r(n) 142 being received, and estimates the echo component d(n) of received samples r(n) 142.

When signal substitution process 202 detects that transmit buffer 210 is empty and CODEC 130 demands more samples, two things occur. On the transmit channel, switch 232 switches so that samples t(n) 134 synthesized by Substitute Transmit Signal Synthesizer 500 are output to CODEC 130 and line interface 132. On the receive channel, switch 234 switches so that the r(n) samples 142 received on line 138 are ignored, and instead samples R(n) synthesized in coprocessor 200 are fed on line 144 through echo subtractor 162 to modem receive process 150. The R(n) samples synthesized for line 144 are synthesized with the knowledge acquired by adaptive FIR filter 300, to approximate the echo component d(n) of r(n) 142, so that echo canceller 160, 162 will essentially cancel the synthesized "echo" being fed it on line 144. The result is that echo-cancelled signal 164 will remain small in amplitude, without exceeding the bounds tolerance of modem receive process 150, thereby reducing the likelihood that a retraining will occur.

Synthesis of a Substitute Receive Signal R(n)

During normal operation, adaptive FIR filter 300 generates a sequence d'(n) 240 estimating the echo component d(n) in r(n). Echo estimate d'(n) 240 is subtracted 242 from r(n) 142, giving a term e(n) 244. Term e(n) 244 is fed back to adaptive FIR filter 300 to adapt the filter 300 to changing echo characteristics of transmission path 134, 130, 132, 138, 132, 130, 142. The operation of adaptive FIR filter 300 will be discussed in further detail below, in connection with FIG. 3. Adaptive FIR filter 300 parallels but does not exactly mimic modem echo estimation process 160.

During sample starved synthesis, echo estimate d'(n) 240 is substituted for received sample sequence R(n) 144. Because of the inexact parallel between adaptive FIR filter 300, modem echo estimation 160, and the actual echo characteristic of path 134, 130, 132, 138, 132, 130, 142, the synthesized echo d'(n) 240 will be slightly different than the echo estimate generated by echo estimation process 160. After echoes are subtracted 162 from synthesized receive samples d'(n)=R(n) 144, the amplitude of sample sequence 164 will be small but non-zero. A zero sequence could be interpreted as a far modem hang up, and modem process 100 would terminate.

Figure 3:
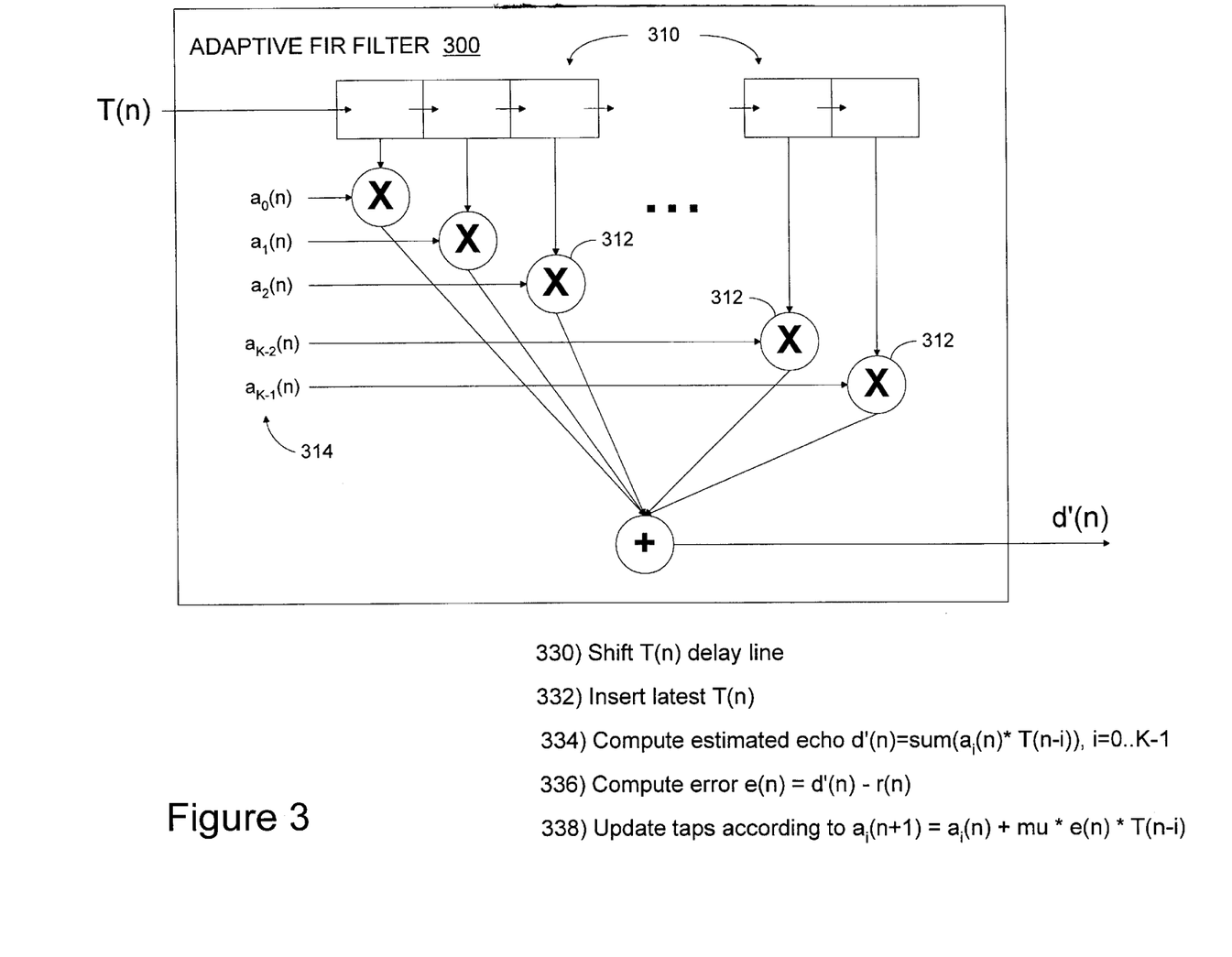
FIG. 3 is a block diagram of an adaptive FIR filter.

Referring to FIG. 3, a modem echo canceller seeks to estimate the echo resulting from a transmitted signal and subtracts it from the received signal, leaving only the far modem signal. A common technique for echo cancellation is an adaptive FIR (Finite Impulse Response) filter.

In long distance modem connections, there are typically two peaks in the echo impulse response. One peak, which occurs with a relatively short delay, is due to impedance mismatches between the modem interface circuit (132 of FIG. 1) and the local telephone loop circuit 138. The other peak is caused by impedance mismatches at the far end of the transmission circuit, where the remote modem is connected. The latter peak occurs at a delay equal to the round trip propagation delay of the circuit. For short distance connections, these two peaks merge and are indistinguishable.

The near echo is usually by far the dominant echo and is often as strong or stronger than the level of the far modem signal. The far echo typically is weaker, and is almost always substantially weaker than the far modem signal. Because of the typical weakness of the far echo signal, an embodiment may be designed to compensate only for near echo, and may ignore the far echo.

Adaptive FIR filter 300 is conventional in the art. Adaptive FIR filter 300 includes a delay line 310, a set of multipliers 312, and a memory vector 314 to hold values called "taps." Delay line 310 is a "bucket brigade:" in each sample processing interval, the contents of the delay line are shifted one cell to the right (the rightmost value is discarded), and a new sample value T(n) is accepted for the leftmost cell. Also in each sample processing interval, taps 314 are updated. Each tap corresponds with a cell in the delay line, and with the age of the data in that cell.

The operation equations of the adaptive FIR filter 300 are shown in the lower right portion of FIG. 3. In step 330, the delay line is shifted. In step 332, the new T(n) value is inserted into the delay line. In step 334, the estimated echo d'(n) is computed as $$d'(n) = \sum_{i=0}^{K-1} a_i(n) \times T(n-i)$$

where n is the index of the current sample processing interval, $a_i$ are the tap coefficients for filter 300, T(n) is the transmit sample 122 for sample processing interval n, and K is the number of taps in FIR filter 300. In step 336, error estimate e(n) is computed as e(n)=d'(n)−r(n)

In step 338, taps $a_i$(n) 314 are updated by computing $a_i$(n+1)=$a_i$(n)+μ×e(n)×T(n−i)

μ(mu), the FIR adaptation step size constant in equation 338, is chosen to balance several competing factors. If μ is much too large, the filter will diverge. If μ is too large, the FIR filter will adapt quickly, but will have a relatively large misadjustment error due to the "uncorrelated noise" effect of the data transmitted by the far modem. A small μ will result in slow adaptation, but a small misadjustment error. If the misadjustment error is too small, the signal substitution process 202 may generate a sample sequence that is too close to the echo cancellation estimate of echo canceller 160, 162, possibly resulting in the hang-up discussed previously. When the value of μ is in a correct range, adaptive FIR filter 300 will produce an estimated echo d'(n) with a misadjustment error of about half the nominal level of the far modem signal x(n).

μ is chosen so that the RMS (root mean square) value of e(n) (the echo estimate error computed by echo canceller 242, 300) will be about half the nominal level of x(n), by the following process. After adaptive FIR filter 300 is trained, modem transmit process 400 is disabled, forcing the signal substitution process 202 into signal substitution mode. Signal substitution process 202 then generates signal d'(n) 240, which is fed via switch 234 to modem echo canceller 160, 162. Signal 164 is monitored. If the RMS of the echo cancelled signal 164 is less than half of its nominal, then μ is increased. If the RMS of echo-cancelled signal 164 is more than half of its nominal, then μ is decreased. Simulations have shown that misadjustment error, and hence the "simulated far modem signal" is proportional to the receive level. That is, with a fixed value of μ, the misadjustment error will stay proportional to the receive level over a range of receive levels. Therefore a μ established for one modem connection will be approximately correct for future connections. μ can be retrained from time to time, or can be fixed in the system firmware.

The number of taps for adaptive FIR filter 300 is chosen with the following in mind. It is empirically observed that the near echo is often far larger than the far signal. The overwhelming majority of the near echo occurs within 4 to 5 milliseconds. Because the echo estimation of adaptive FIR filter 300 is desirably only approximate, it is sufficient to only provide filter taps and delay line cells to correspond to the amount of time for the strongest portion of the near echo, typically the first 4 to 5 milliseconds. The far echo can be simply ignored, or treated as a fortuitous source of misadjustment error and difference from echo estimation 160. Different modem modulation standards typically are implemented with different sampling rates, varying from 7,200 samples per second to 10,287 samples per second. The number of taps provided may either be fixed at a value corresponding to the longest-expected echo at the fastest sampling frequency (at lower sampling rates, the more-delayed tap values will be approximately zero), or may be adapted at the beginning of each modem session to provide enough taps to cover the longest-expected echo. Thus, one embodiment provides about 52 filter taps (5 milliseconds times 10,287 samples per second).

During sample-starved sample synthesis operation, adaptation (updating the values of taps as) ceases, because the t(n) output is uncorrelated to the r(n) received, and any adaptation would be spurious.

Synthesis of a Substitute Transmit Signal t(n)

Figure 4:
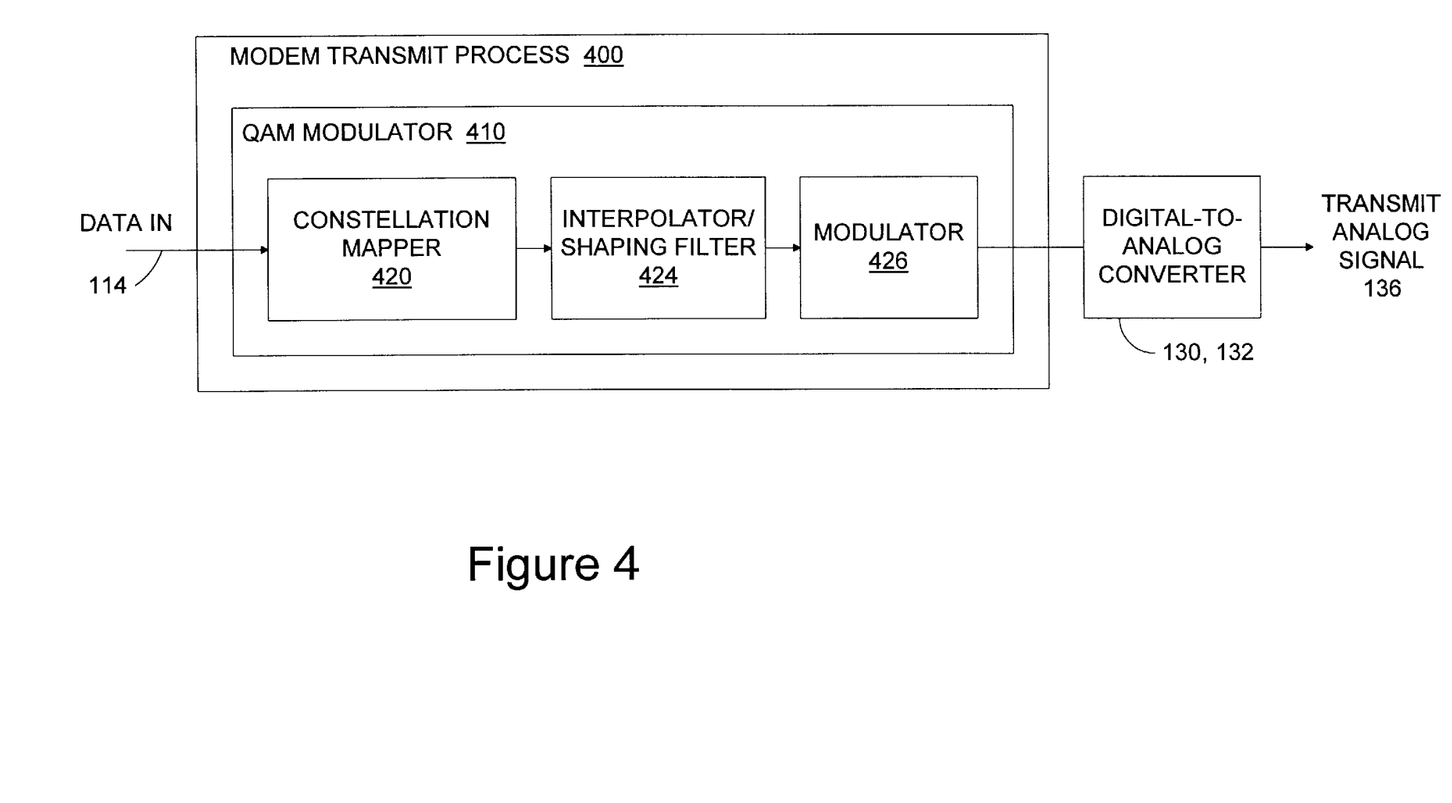
FIG. 4 is a block diagram of a QAM modulator.
Figure 5:
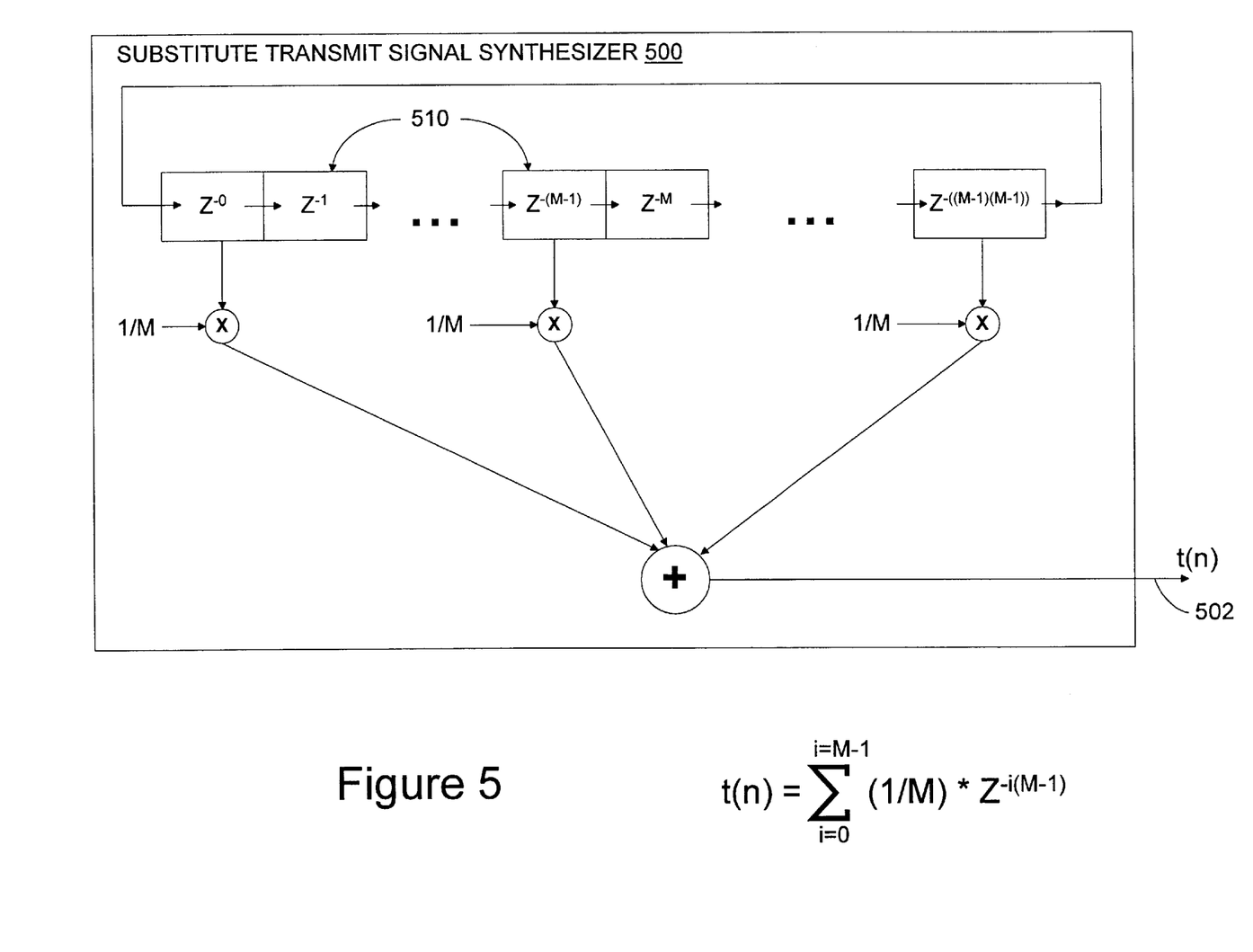
FIG. 5 is a block diagram of a substitute transmit signal synthesizer for performance by a block shown in FIG. 2.

Referring to FIGS. 4 and 5, during intervals of transmit sample starvation, the t(n) values 502 are synthesized to be minimally disruptive to the far modem receiver, as a signal that conveys no timing information. During the duration of the data-starved condition, none of the individual T(n) samples are transmitted.

FIG. 4 shows a simplified block diagram of a QAM (Quadrature Amplitude Modulated) modulator. Constellation mapper 420 uniquely maps groups of data bits 114 into points on a two dimensional phase-amplitude plane. The set of defined points is called the constellation. For example, the V.22 communications protocol defines a constellation with 4 points, where the input bit patterns 00, 01, 10, and 11 are mapped to the coordinates (−1,−1), (−1,1), (1,−1), and (1,1), respectively. The mapped constellation points are upsampled and band-limited by interpolator/shaping filter 424. The upsampled and band-limited samples are then modulated by modulator 426 into a passband signal. Finally, a digital-to-analog converter 130, 132 converts the digital samples to an analog signal which is suitable for transmission over an analog channel.

A modem receiver recovers the transmitted bits by reversing the modulation process. One particular aspect of a receiver involves synchronizing the receiver sampling to the exact rate at which the corresponding transmitter is generating constellation points. This is called "timing recovery". Timing recovery slightly increases or decreases the receiver sampling rate so as to keep the receiver sampling process synchronized with the transmitter. Proper timing recovery enables the receiver to sample the received signal synchronously with the arrival of the constellation points, rather than at some transition point between two constellation points.

The synthesized substitute signal is generated from a base signal, which consists of a contiguous block of modem transmit samples. The synthesized substitute signal contains equal timing information at all phases of the signal, so that the remote receiver's timing recovery process will not prefer any particular phase of the receive signal, but instead simply "coast" during periods of signal substitution. A synthesized signal that allows the remote receiver to coast is less likely to cause the remote receiver to diverge its timing synchronization from the transmitter during periods of t(n) signal substitution. The substitute signal t(n) is synthesized by taking a linear combination of transmitted samples at all phases of the constellation point content. For example, if the transmitted signal contains one constellation point for each M transmitted samples (M samples per constellation point resulting from the upsampling discussed above), then the synthesized transmit signal contains a sum of M sequences, each of the M sequences offset from the base sequence such that the timing information is at a different one of the M possible sampling phases. Such a signal will confer no timing phase preference to a remote receiver's timing recovery process. The substitute signal t(n), for example, formed by taking combination of transmitted signals at all phases of the constellation point content, or by providing equal timing information at all phases of the substitute signal, or by taking the sum of sequences such that the timing information of the summed sequences is at a different one of the possible sampling phases, or by averaging the values of several samples from a generated transmit sample sequence, or a substitute signal that confers no timing phase preference to a remote receiver, or a signal that conveys no timing information to a far modem receiver, may be among examples of possible substitute waveform sample sequences that are essentially free of timing information.

Referring to FIG. 5, a process for synthesizing the substitute transmit signal includes of delay line 510 which has (M−1)*(M−1)+1 delay elements, and M multipliers, each applying a gain of 1/M to its respective delay element. The multipliers are placed at intervals of (M−1) elements in the delay line, so that each multiplier output produces an output which is one of the M possible timing phases.

Periodically, a block of (M−1)*(M−1)+1 samples is copied from transmit buffer 210 to delay line 510 of the substitute transmit signal synthesizer. When transmit buffer 210 becomes starved for samples T(n) 122, samples t(n) 502 are synthesized by substitute transmit signal synthesizer 500. Between output samples, the contents of the substitute transmit signal synthesizer delay line 510 are shifted right by one sample, with the oldest sample (from element $Z^{-(M-1)}$ $(M-1)$) being recycled back into the $Z^{-0}$ element. The copying from buffer 210 to delay line 510 occurs at a period roughly corresponding, within a factor of ten or so, to (M−1)*(M−1)+1 sample times.

Because the present embodiment upsamples to generate either three or twelve samples per constellation point, and since twelve is an integer multiple of three, delay line 510 has twelve taps. The same process used for synthesizing transmit samples for twelve samples-per-constellation-point modes works to synthesize a three samples-per-constellation-point signal, with a redundancy of 4.

Referring again to FIGS. 1 and 2, coprocessor 200 may be implemented as a coprocessor for installation in a computer, for instance, the MPACT coprocessor from Chromatic Research, Inc. The MPACT coprocessor is dedicated to performing real-time data tasks such as modem processing and multimedia.

It should be understood that the above description of embodiments is merely illustrative, and that many modifications and other embodiments are within the scope of the following claims.

What is claimed is:

1. A service chip for use with a computer, comprising:
a CPU interface designed to receive a transmit sample sequence from a modem sample generator executing on a central processor of the computer, and presenting a receive sample sequence to a modem sample receiver executing on the central processor;
a transceiver interface for presenting data to a line interface for conversion by a digital-to-analog converter to analog signals for transmission on a telephone line;
an adaptive echo cancellation filter, designed to adapt in response to an echo correlation between data transmitted over a transmit channel of the modem and data received on a receive channel of the transceiver interface;
a monitor designed to monitor the transmit sample sequence for a data starvation condition; and
a first synthesizer designed to synthesize a transmit sample sequence for delivery to the-digital-to-analog converter over the transceiver interface when the monitor detects the data starvation condition, the synthesized transmit sample sequence being essentially free of timing information; and
a second synthesizer designed to synthesize a received data sequence for delivery on the modem receive channel to the central processing unit through the CPU interface when the monitor detects the data starvation condition, the synthesized received data sequence imperfectly approximating an echo of the transmit channel, synthesis of the received data sequence being based on the adapted parameters of the echo cancellation filter.

2. The service clip of claim 1, wherein:
the imperfectly approximated echo reflects an intentional misadjustment, induced by one or more of (1) ignoring components of the data sequence received from a far modem, and (2) selecting a filter parameter to preserve a misadaptation of the echo cancellation filter.

3. The service clip of claim 1, wherein:
the synthesized transmit sample sequence is synthesized from transmit samples drawn to provide roughly equal representation of all phases of the transmit signal.

4. An apparatus for use with a computer comprising:
a monitor for monitoring a modem transmit channel for a data starvation condition, data of the transmit channel produced by a process for execution on the central processing unit of the computer; and
a synthesizer designed to synthesize a received data sequence to be provided to the central processing unit on a modem receive channel when the monitor detects the data starvation condition.

5. The apparatus of claim 4, wherein:
the received data sequence is synthesized to approximate an echo of the transmit channel.

6. The apparatus of claim 5, wherein:
the synthesized approximate echo reflects an intentional misadjustment induced by ignoring components of the data sequence received on the receive channel.

7. The apparatus of claim 5, wherein:
the synthesized approximate echo reflects an intentional misadjustment induced by selecting a filter parameter to preserve a misadaptation of the filter.

8. The apparatus of claim 4, wherein:
the apparatus is embodied in a coprocessor for installation in a chassis of the computer.

9. The apparatus of claim 8, further comprising:
the computer, the central processor of the computer being a microprocessor executing a program performing digital signal processing to synthesize the data of the transmit channel.

10. The apparatus of claim 4, wherein:
the data of the transmit channel are generated by a modem transmit process.

11. The apparatus of claim 4, further comprising:
a transmit sample synthesizer, responsive to detection of the data starvation condition, and designed to synthesize a substitute waveform sample sequence for transmission over a telecommunications channel, the synthesized waveform sample sequence being essentially free of timing information.

12. The apparatus of claim 11, wherein:
the substitute waveform sample sequence is synthesized by averaging the values of several samples from a generated transmit sample sequence.

13. The apparatus of claim 12, wherein:
the number of samples averaged corresponds to an oversampling factor of the modem transmit channel.

14. The apparatus of claim 12, wherein:
the samples averaged are drawn to provide roughly equal representation of all phases of the transmit signal.

15. The apparatus of claim 4, further comprising:
circuitry designed to adapt parameters of an echo cancellation filter of the modem receive channel, the adapting being responsive to data transmitted over the transmit channel and received on the receive channel;
the data of the synthesized received data sequence being based on the adapted parameters of the echo cancellation filter.

16. A method comprising:
when a data starvation condition is detected on a modem transmit data channel, synthesizing a data sequence in a receive channel of the modem, the synthesized data sequence being essentially independent of data received on a receive terminal of the modem.

17. The method of claim 16, wherein:
the synthesized receive data sequence is synthesized to approximate an echo of data transmitted on the transmit data channel.

18. The method of claim 17, wherein:
the synthesized approximate echo reflects an intentional misadjustment.

19. The method of claim 18, wherein:
the intentional misadjustment is induced by ignoring components of the data sequence received from a far modem.

20. The method of claim 19, wherein:
the ignored component includes message data from the far modem.

21. The method of claim 19, wherein:
the ignored component includes an echo from the far modem.

22. The method of claim 18, wherein:
the intentional misadjustment is induced by configuring a filter with a number of taps insufficient to model an impulse response of a round-trip over a transmission channel from the transmit data channel to the receive channel.

23. The method of claim 18, wherein:
the intentional misadjustment is induced by selecting a filter adaptation parameter to preserve a misadaptation of the filter.

24. The method of claim 23, wherein:
the selected filter adaptation parameter is the filter's adaptation mu parameter, with a value selected so that the amplitude of a misadjustment component of an echo approximation is approximately equal to half the amplitude of the receive data sequence.

25. The method of claim 23, wherein:
the selected filter adaptation parameter is the filter's adaptation mu parameter, with a value selected so that the amplitude of a misadjustment component of an echo approximation is approximately equal to the amplitude of a message signal from a far modem.

26. The method of claim 16, further comprising:
detecting the starvation condition when a CODEC demands data from an empty transmit data buffer.

27. The method of claim 16, further comprising:
when the monitor detects the data starvation condition, synthesizing a transmit data sequence for conversion by a digital-to-analog converter for transmission on a transmission channel, the synthesized transmit data sequence being essentially free of timing information.

28. The method of claim 27, further comprising:
synthesizing the transmit data sequence by averaging the values of several samples from a generated transmit sample sequence.

29. The method of claim 28, wherein:
the number of samples averaged corresponds to an oversampling factor of the modem transmit data channel.

30. The method of claim 16, further comprising:
adapting parameters of an echo cancellation filter of the modem, the adapting being responsive to the data transmitted over the transmit data channel and received on the receive channel; and
synthesizing the synthesized data sequence based on the adapted parameters of the echo cancellation filter.

31. A service chip for use with a computer, comprising:
a first interface designed to receive a transmit sample sequence from a modem sample generator executing on a central processor of the computer;
a second interface for presenting data to a line interface, the line interface including a digital-to-analog converter for converting the transmit sample sequence to analog signals for transmission on a telephone line;
a monitor for monitoring the transmit sample sequence for a data starvation condition; and
a synthesizer designed to synthesize a transmit sample sequence for presentation on the second interface when the monitor detects the data starvation condition, the synthesized transmit sample sequence containing samples other than the transmit sample sequence received at the first interface.

32. The chip of claim 31, wherein:
the synthesized transmit sample sequence is essentially free of timing information.

33. The chip of claim 32, wherein:
the synthesized transmit sample sequence is synthesized from transmit samples drawn to provide roughly equal representation of all phases of the transmit signal.

34. The chip of claim 32, further comprising:
the computer, the central processor of the computer being a microprocessor executing a program performing digital signal processing to synthesize the data of the transmit channel.

35. A method comprising:
adapting parameters of an echo cancellation filter operating between transmit and receive channels of a modem, the adapting being responsive to data transmitted over the transmit channel and received on the receive channel; and
when the transmit channel is disrupted, synthesizing a data sequence in the receive channel, the data of the synthesized sequence being based on the adapted parameters of the echo cancellation filter.

36. The method of claim 35, wherein:
the synthesized receive data sequence is synthesized to approximate an echo of data transmitted on the transmit channel.

37. The method of claim 36, wherein:
the synthesized approximate echo reflects an intentional misadjustment.

38. The method of claim 37, wherein:
the intentional misadjustment is induced by ignoring message data from a far modem.

39. The method of claim 37, wherein:
the intentional misadjustment is induced by configuring a filter with a number of taps insufficient to model an impulse response of a round-trip over a transmission channel from the transmit channel to the receive channel.

40. The method of claim 37, wherein:
the intentional misadjustment is induced by selecting a filter adaptation mu parameter so that the amplitude of a misadjustment component of the echo approximation is approximately equal to half the amplitude of the receive data sequence.

41. The method of claim 35, further comprising:
detecting the starvation condition when a CODEC demands data from an empty transmit data buffer.

42. The method of claim 35:
wherein the disruption is a data starvation condition in the transmit channel;
and further comprising the step of synthesizing a substitute transmit data sequence for transmission over a telecommunications channel.

43. The method of claim 42, wherein the synthesized substitute transmit data sequence comprises a waveform sample sequence essentially free of modem timing information.

44. The method of claim 43, further comprising:
synthesizing the substitute transmit data sequence by averaging the values of several samples from a generated transmit sample sequence.

45. The method of claim 44, wherein:
the number of samples averaged corresponds to an oversampling factor of the modem transmit data channel.

46. The method of claim 44, wherein:
the samples averaged are drawn to provide roughly equal representation of all phases of the transmit signal.

47. The method of claim 42, further comprising:
when the data starvation condition is detected, synthesizing a receive data sequence in the receive channel, the data of the synthesized receive data sequence being based on the adapted parameters of the echo cancellation filter.

48. A method comprising the steps of:
when a data starvation condition is detected in a modem transmit channel, synthesizing a substitute sequence, consisting essentially of samples of an analog waveform, to be transmitted over a telecommunications channel, the substitute waveform sample sequence beiong substantially free of timing information.

49. The method of claim 48, further comprising the step of
synthesizing each sample of the susbtitute waveform sample sequence be averaging values of several samples from a transmit sample sequence encoding digital data for transmission.

50. The method of claim 49, wherein:
the number of samples averaged corresponds to an oversampling factor of the modem transmit channel.

51. The method of claim 49, wherein:
the samples averaged are drawn to provide roughly equal representation of all phases of a generated transmit sample sequence.

52. The method of claim 49, wherein:
the substitute waveform sample sequence is in a form intentionally violating a transmission protocol used by the modem.

53. The method of claim 48, further comprising the steps of:
adapting parameters of an echo cancellation filter of a receive channel of the modem, the adapting being responsive to data transmitted over the channel of the modem and receive on the receive channel, and
when the monitor detects the data starvation condition, synthesizing a receive data sequence of the receive channel, the synthesizing receive data sequence being based on the adapted parameters of the echo cancellation filter.

54. The method of claim 48, further comprising the steps of:
when a data starvation condition is detected on a modem transmit channel, synthesizing a data sequence on a receive channel of the modem, the synthesized receive data sequence being substantially independent of data received on a receive terminal of the modem.

55. The method of claim 48, wherein:
the substituted waveform sample sequence is in a form intentionally violating a transmission protocol of the modem.

56. A method comprising the step of:
when a data starvation condition is detected in a modem transmit channel, synthesizing a substitute waveform sample sequence for transmission over a telecommunications channel, the substitute waveform sample sequence being substantially free of timing information.

57. The method of claim 56, further comprising the steps of:
synthesizing the substitute waveform sample sequence by averaging values os several samples from a generated transmit sample sequence.

58. The method of claim 57, wherein:
the number of samples averaged corresponds to an oversampling factor of the modem transmit signal.

59. The method of claim 57, wherein:
the samples averaged are drawn to provide roughly equal representation of all phases of the generated transmit sample sequence.

60. The method of claim 56, further comprising the steps of:
adapting parameters of an echo cancellation filter of a receive channel of a modem, the adapting being responsive to data transmitted over the modem transmit channel of the modem and received on the receive channel; and
when the monitor detected the data starvation condition, synthesizing a receive data sequence in the receive channel, the synthesized receive data sequence being based on the adapted parameters of the echo cancellation filter.

61. An apparatus, comprising:
a transmit channel of a modem designed to transmit over a telecommunications channel, the transmission observing a modem transmissiono protocol;
a synthesizer designed to respond to detection of a disruption in the modem transmit channel synthesizing a substitute waveform sample sequence for transmission over the telecommunications channel, the substitute waveform sample sequence being substantially free of timing information.

62. The apparatus of claim 61, wherein the susbtitute waveform sample sequence is synthesized be averaging values of several samples from a generated transmit sample sequence.

63. The apparatus of claim 61, further comprising:

circuitry designed to adapt parameters of an echo cancellation filter of a receive channel of the modem, the adapting being responsive to data transmitted over the modem transmit channel and received on the receive channel; and a second synthesizer designed to synthesized a receive data sequence for delivery on the modem receive channel to a computer when the disruption is detected, synthesis of the receive data sequence being based on the adapted parameters of the acho cancellation filter.

64. The apparatus of claim 61, wherein the substitute waveform sample sequence is designed to allow a timing recovery component of a remote modem to coast.

65. The apparatus of claim 61, further comprising:

circuitry responsive to detection of a data starvation condition on a modem transmit channel, and designed to synthesize a receive data sequence on a receive channel of the modem, the synthesized receive data sequence beign substantially independent of data received on a receive terminal of the modem.

66. The apparatus of claim 61, wherein:

the substitute waveform sample sequence is in a form intentionally violating a transmission protocol of the modem.

67. A method comprising the steps of:

transmitting data from a transmit channel of a modem over a telecommunications channel, the transmission observing a modem transmission protocol; and when a disruption is detected in the modem transmit channel, synthesizing a substitute transmit data sequence for transmission over the telecommunications channel, the synthesized substitute transmit data sequence being in a form intentionally violating the modem transmission protocol.

68. The method of claim 67, wherein the synthesized substitute transmit data sequence comprises a waveform sample sequence substantially free of modem timing information.

69. The method of claim 68, further comprising the step of:

synthesizing the synthesized substitute transmit data sequence be averaging values of several samples from a generated transmit sample sequence.

70. The methof of claim 69, wherein:

the number of samples averaged corresponds to an oversampling factor of the modem transmit channel.

71. The method of claim 69, wherein:

the samples averaged are drawn to provide roughly equal representation of all phases of the generated transmit sample sequence.

72. The method of claim 67, further comprising the steps of:

adapting parameters of an echo cancellation filter of a receive channel of the modem, the adapting being responsive to data transmitted over the modem transmit channel and received on the modem receive channel; and when the monitor detects the message data starvation condition, synthesizing a receive data sequence in the modem receive channel, the synthesized receive data sequence being based on the adapted parameters of the echo cancellation filter.

73. The method of claim 67, wherein the synthesized substitute transmit data sequence is designed to allow a timing recovery component of a remote modem to coast.

74. The method of claim 67, further comprising the steps of:

when the disruption is detected, synthesizing a receive data sequence on a receive channel of the modem, the synthesized receive data sequence being substantially independent of data received on a receive terminal of the modem.

75. A transmit channel of a modem, comprising:

circuitry and/or software designed to encode data according to a modem transmission protocol for transmission over a telecommunications channel; and circuitry and/or software effective when a disruption is detected in the modem transmit channel, to synthesize a substitute transmit data sequence for transmission over the telecommunications channel, the synthesizing substitute transmit data sequence being in a form intentionally violating the modem transmission protocol.

76. The apparatus of claim 75, wherein the synthesizing subsitute transmit data sequence comprises a waveform sample sequence substantially free of modem timing information.

77. The apparatus of claim 75, wherein the synthesizing subsitute transmit data sequence is synthesizing be averaging values of several samples from a generated transmit sample sequence.

78. The apparatus of claim 75, further comprising:

circuitry designed to adapt parameters of an echo cancellation filter of a receive channel of the modem, the adapting being responsive to data transmitted over the modem transmit channel and receive on the receive channel; and a second synthesizer designed to synthesize a receiver data sequence for delivery on the modem receive channel to a computer when the disruption is detected, synthesis of the receive data sequence being based on the adapted parameters of the echo canecellation filter.

79. The apparatus of claim 75, wherein the synthesized subsitute transmit data sequence is designed to allow a timing recovery component of a remote modem to coast.

\* \* \* \* \*

UNITED STATES PATENT AND TRADEMARK OFFICE
CERTIFICATE OF CORRECTION

PATENT NO. : 6,563,863 B1
DATED : May 13, 2003
INVENTOR(S) : Brooks S. Read

It is certified that error appears in the above-identified patent and that said Letters Patent is hereby corrected as shown below:

<u>Title page,</u>
*Primary Examiner* is not "David E. Boundy" should be -- Jean B. Corrielus --.
*Attorney Agent or Firm* should be -- David E. Boundy; Schulte Roth & Zabel, LLP --

<u>Column 6,</u>
Line 11, "taps as" should be -- taps $a_i$ --.

<u>Column 8,</u>
Line 14, "clip" should be -- chip --.
Line 20, "clip" should be -- chip --.

<u>Column 11,</u>
Line 50, "beiong" should be -- being --.
Line 53, "susbtitute" should be -- substitute --, and at
Line 54, "be" should be -- by --.

<u>Column 12,</u>
Line 9, "synthesizing" should be -- synthesized --.
Line 19, "substituted" should be -- substitute --.
Line 33, "os" should be -- of --.
Line 37, "signal" should be -- channel --.
Line 49, "detected" should be -- detects --.
Line 57, "transmissiono" should be -- transmission --, and at
Line 59, the word -- by -- should be inserted between "channel" and "synthesizing".
Line 64, "susbtitute" should be -- substitute --, and at
Line 65, "be" should be -- by --.

<u>Column 13,</u>
Line 8, "synthesized" should be -- synthesize --, and at
Line 12, "acho" should be -- echo --.
Line 21, "beign" should be -- being --.
Line 47, "be" should be -- by --.
Line 49, "methof" should be -- method --.

UNITED STATES PATENT AND TRADEMARK OFFICE
CERTIFICATE OF CORRECTION

PATENT NO. : 6,563,863 B1
DATED : May 13, 2003
INVENTOR(S) : Brooks S. Read

It is certified that error appears in the above-identified patent and that said Letters Patent is hereby corrected as shown below:

<u>Column 14,</u>
Line 29, "synthesizing" should be -- synthesized --.
Lines 33-34, "synthesizing subsitute" should be -- synthesized substitute --.
Lines 37-38, "synthesizing subsitute" should be -- synthesized substitute --, and in
Line 38, "synthesizing be" should be -- synthesized by --.
Lines 47, "receiver" should be -- receive --, and in
Line 51, "canecellation" should be -- cancellation --.
Line 53, "subsitute" should be -- substitute --.

Signed and Sealed this

Ninth Day of September, 2003

JAMES E. ROGAN
*Director of the United States Patent and Trademark Office*